United States Patent Office 3,402,648
Patented Sept. 24, 1968

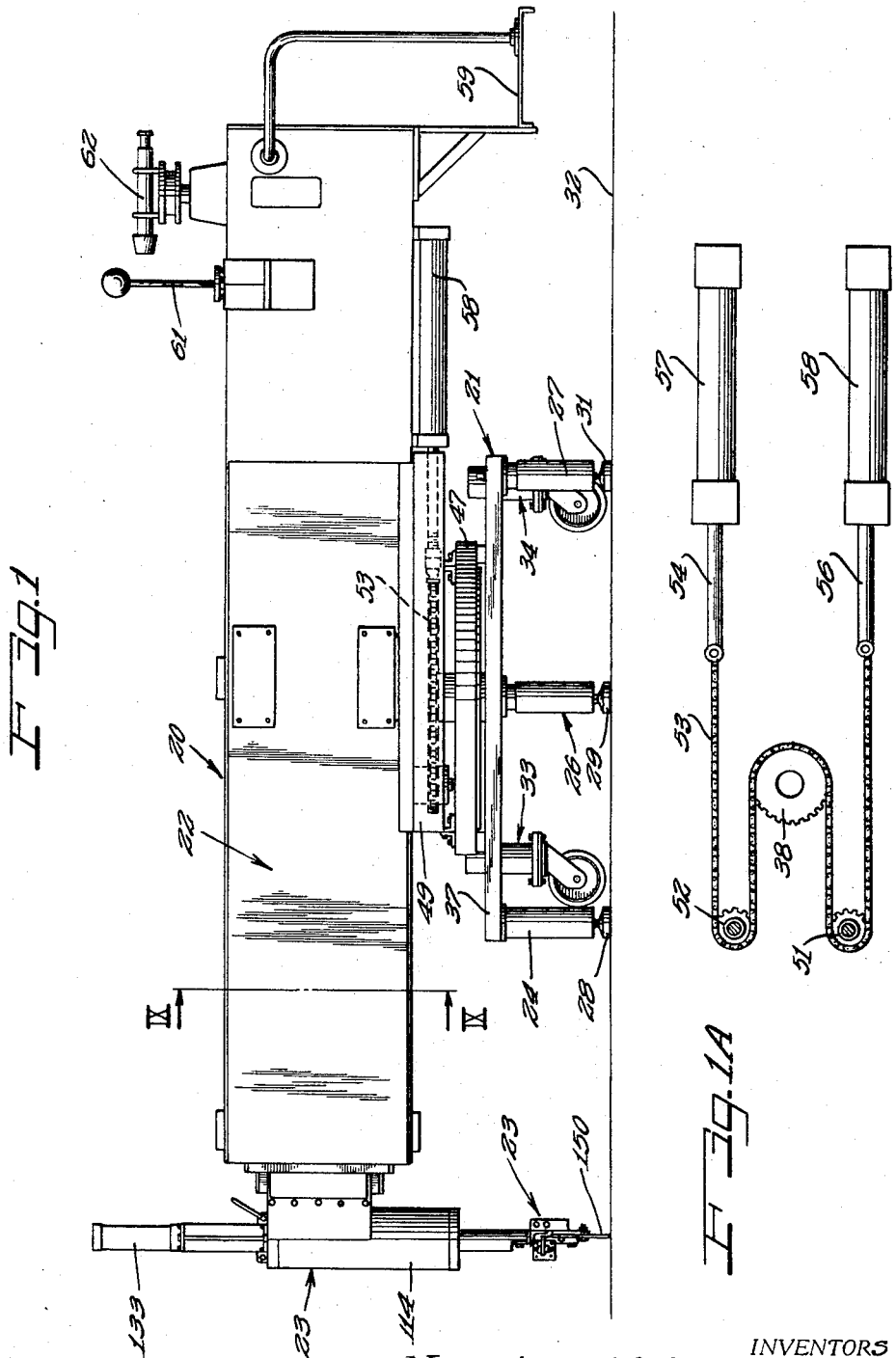

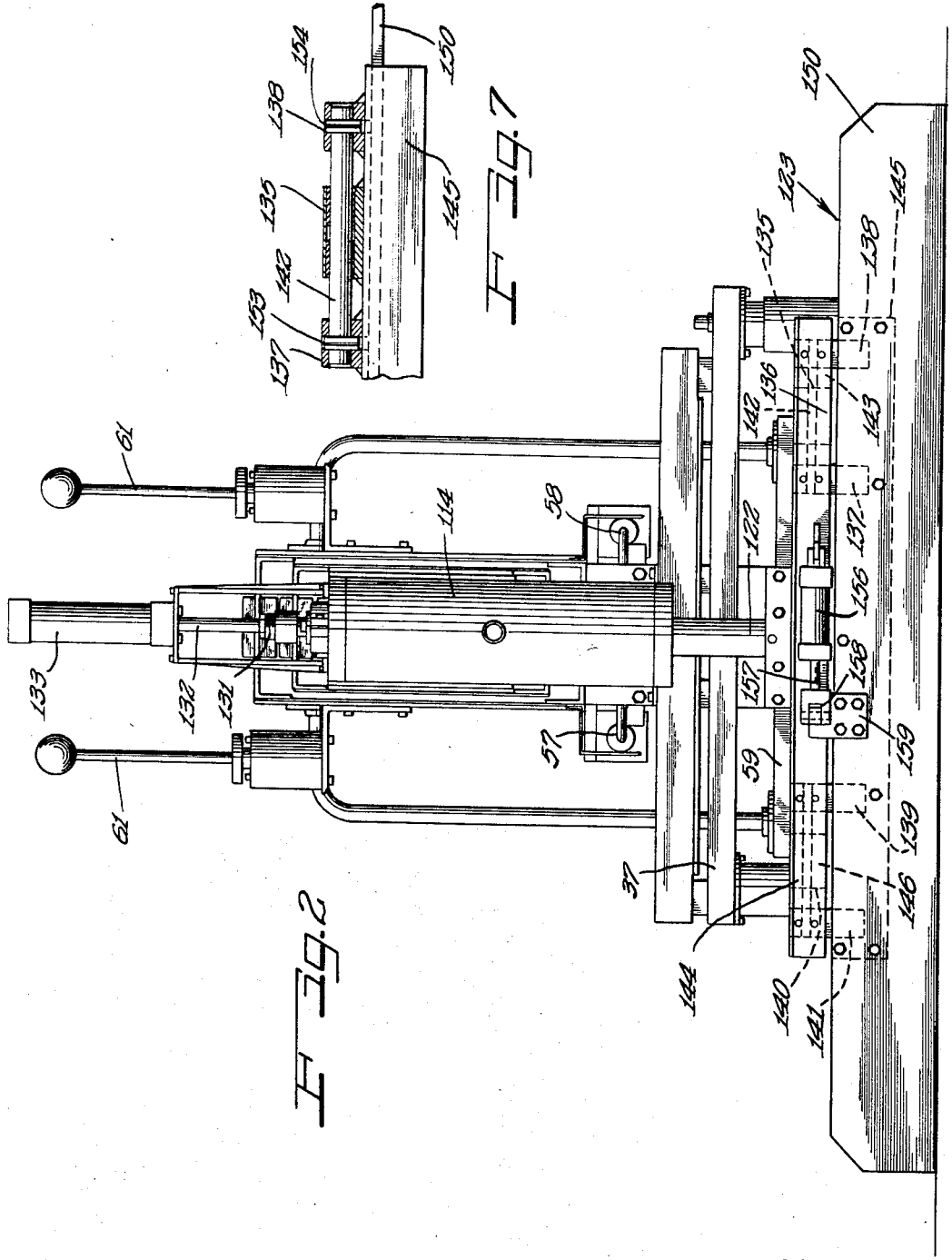

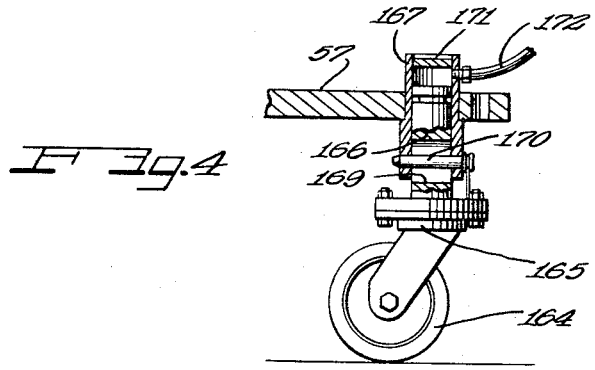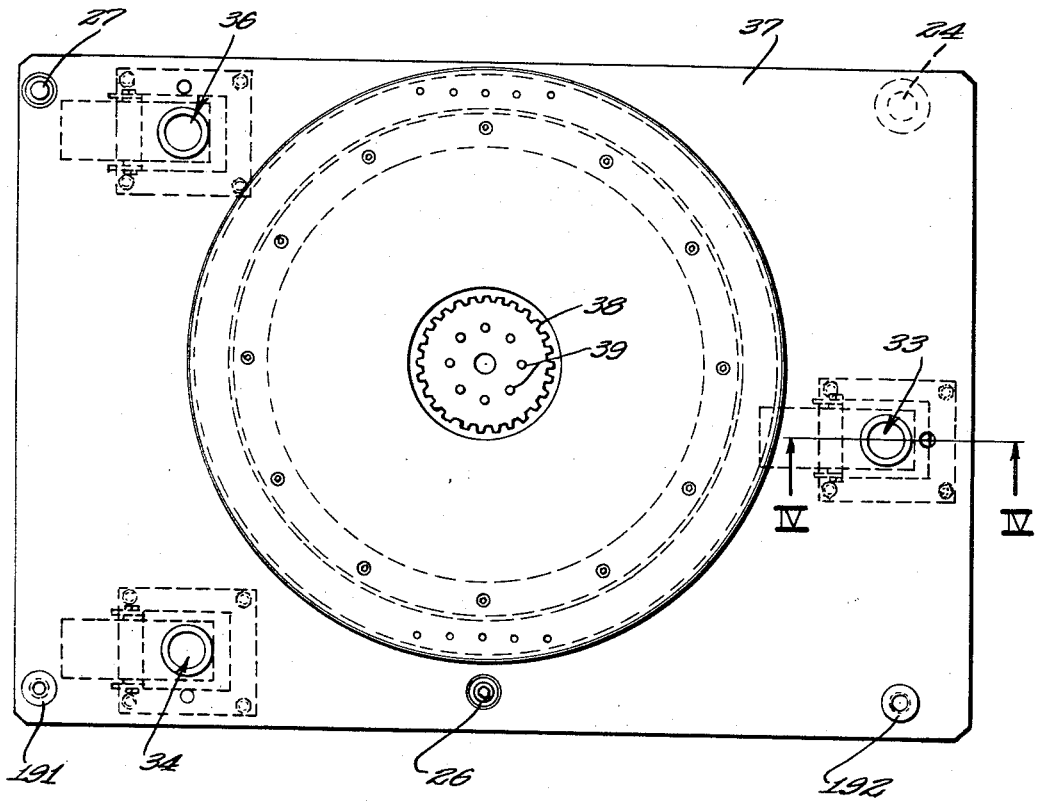

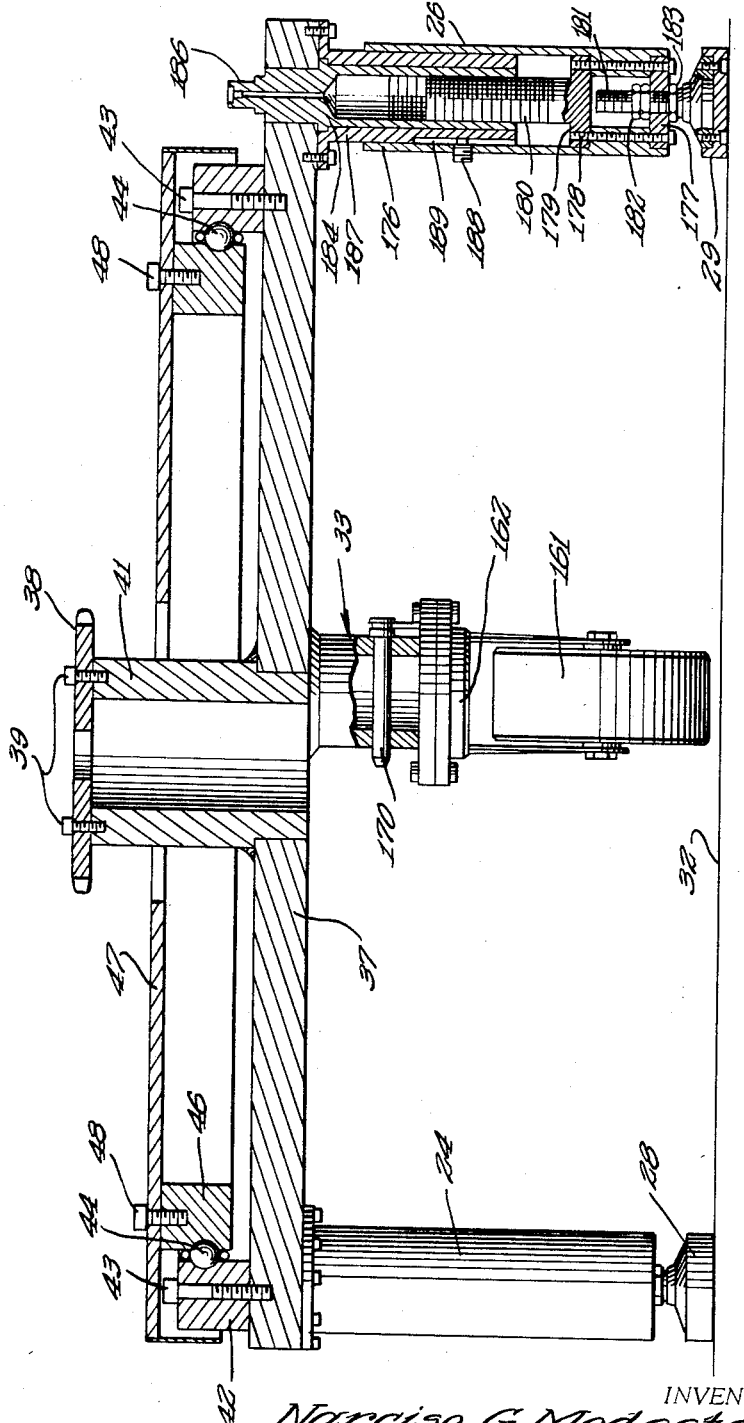

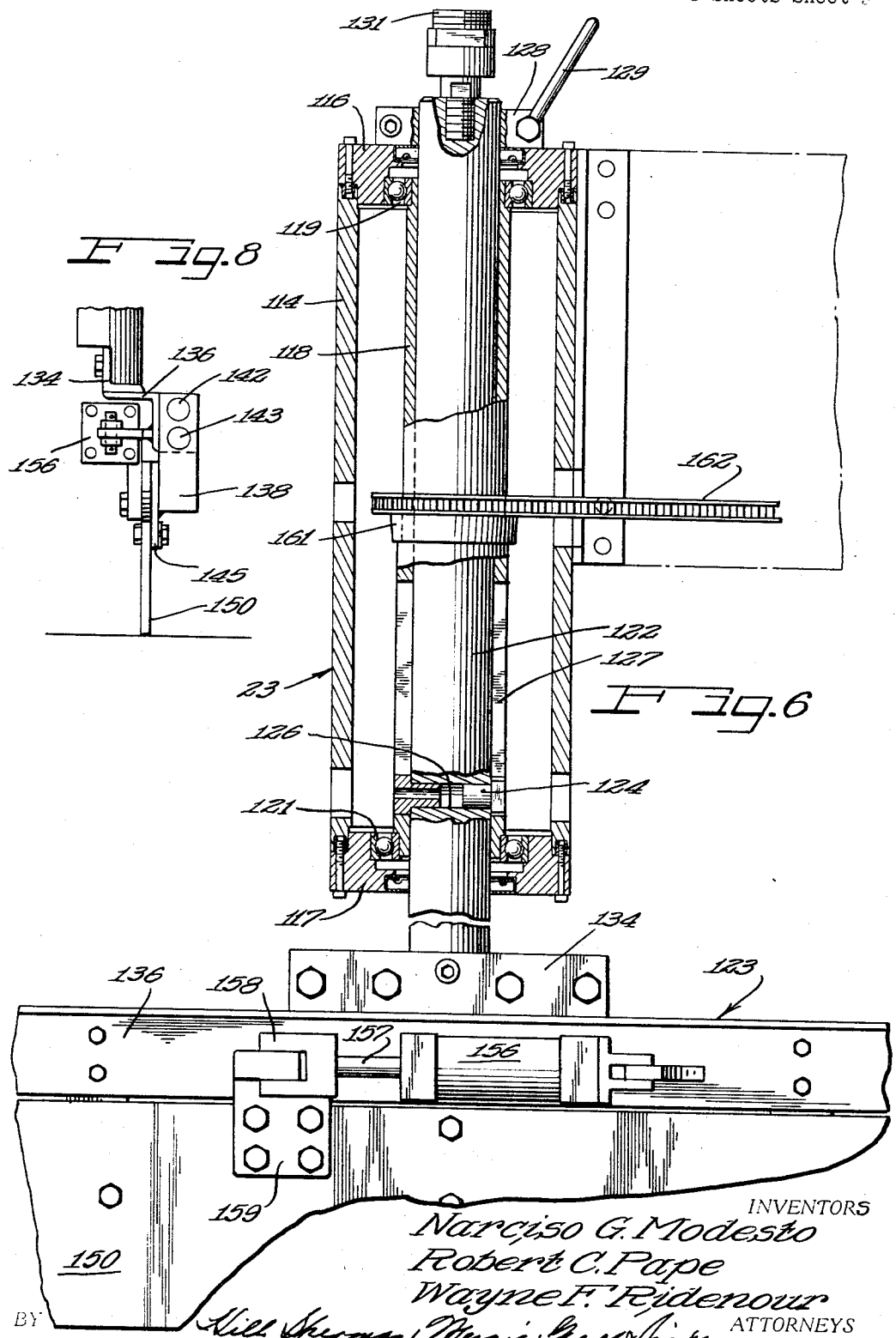

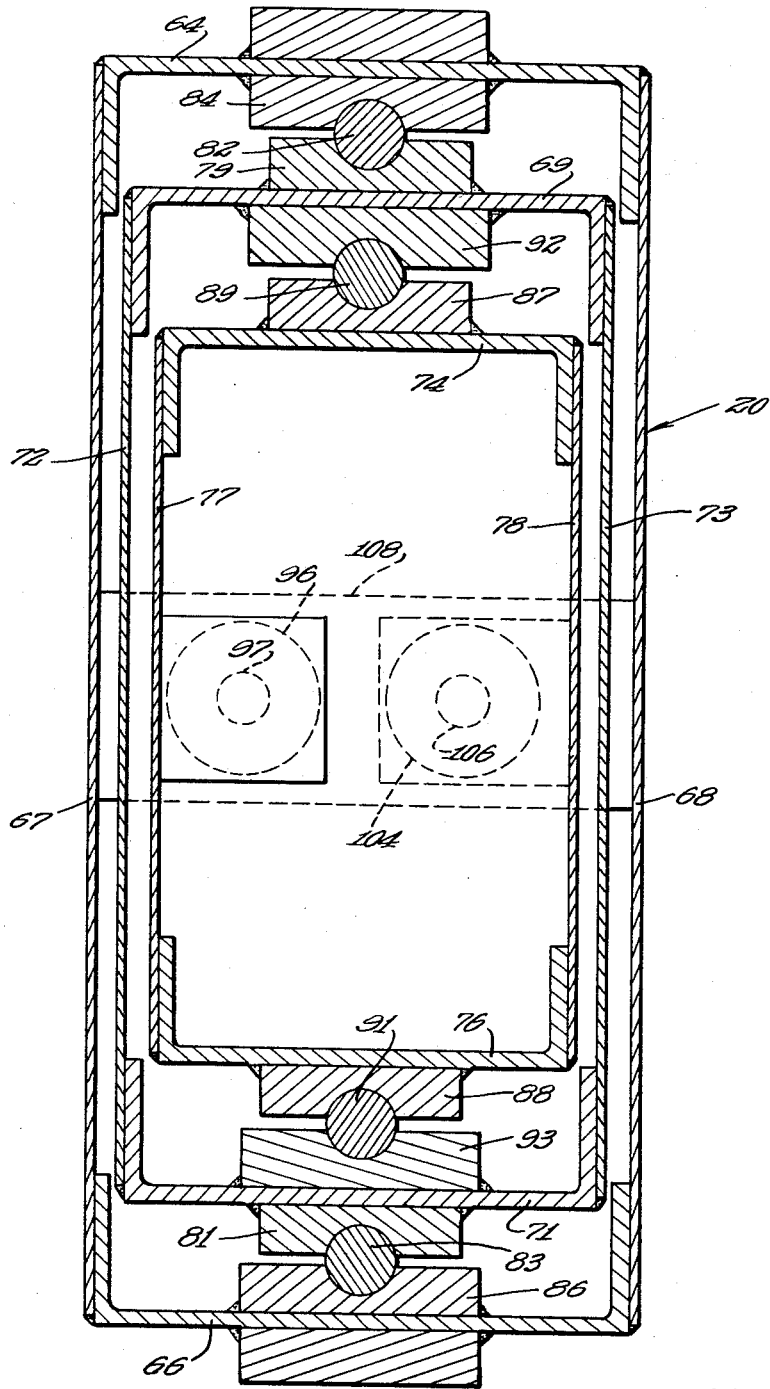

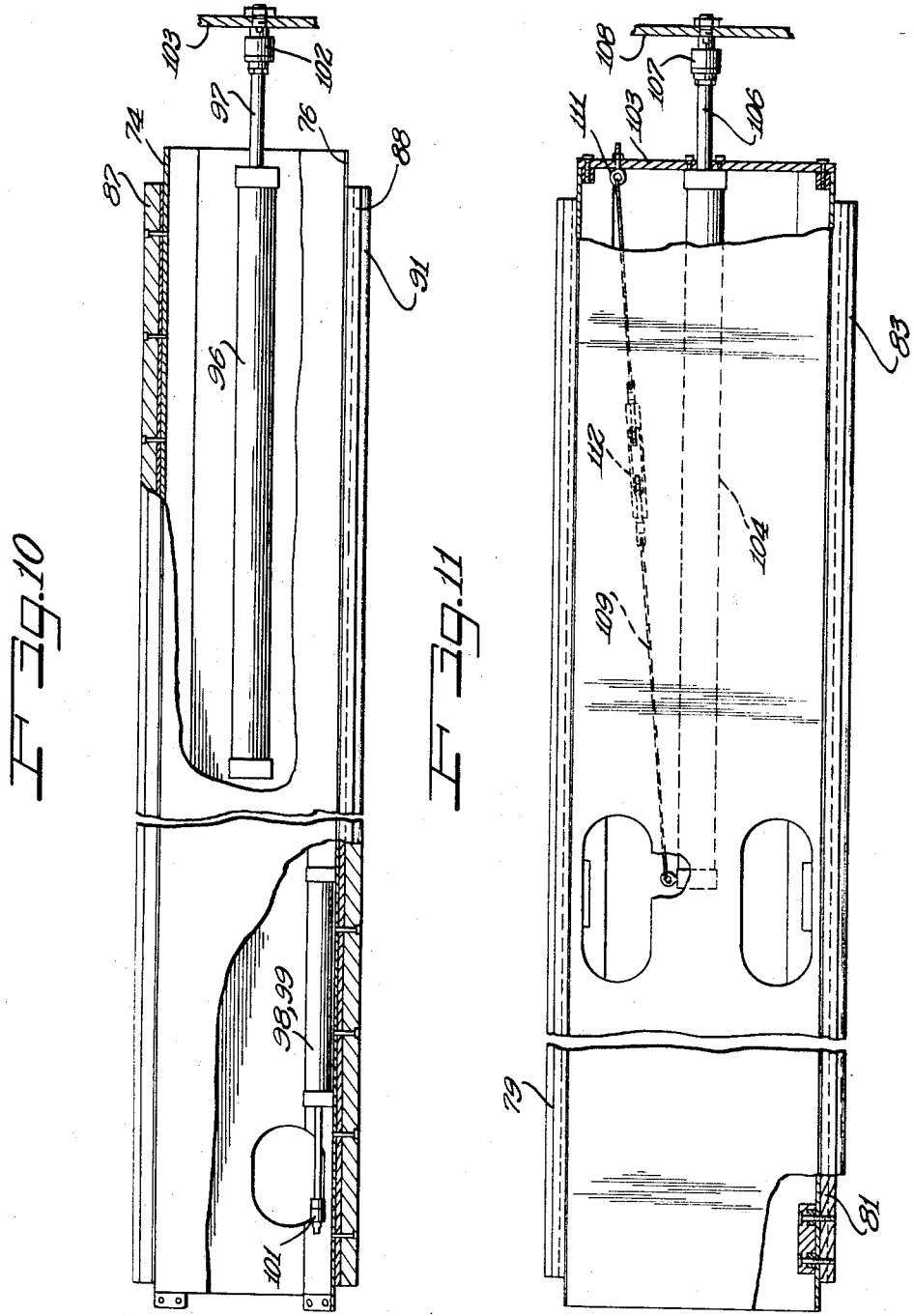

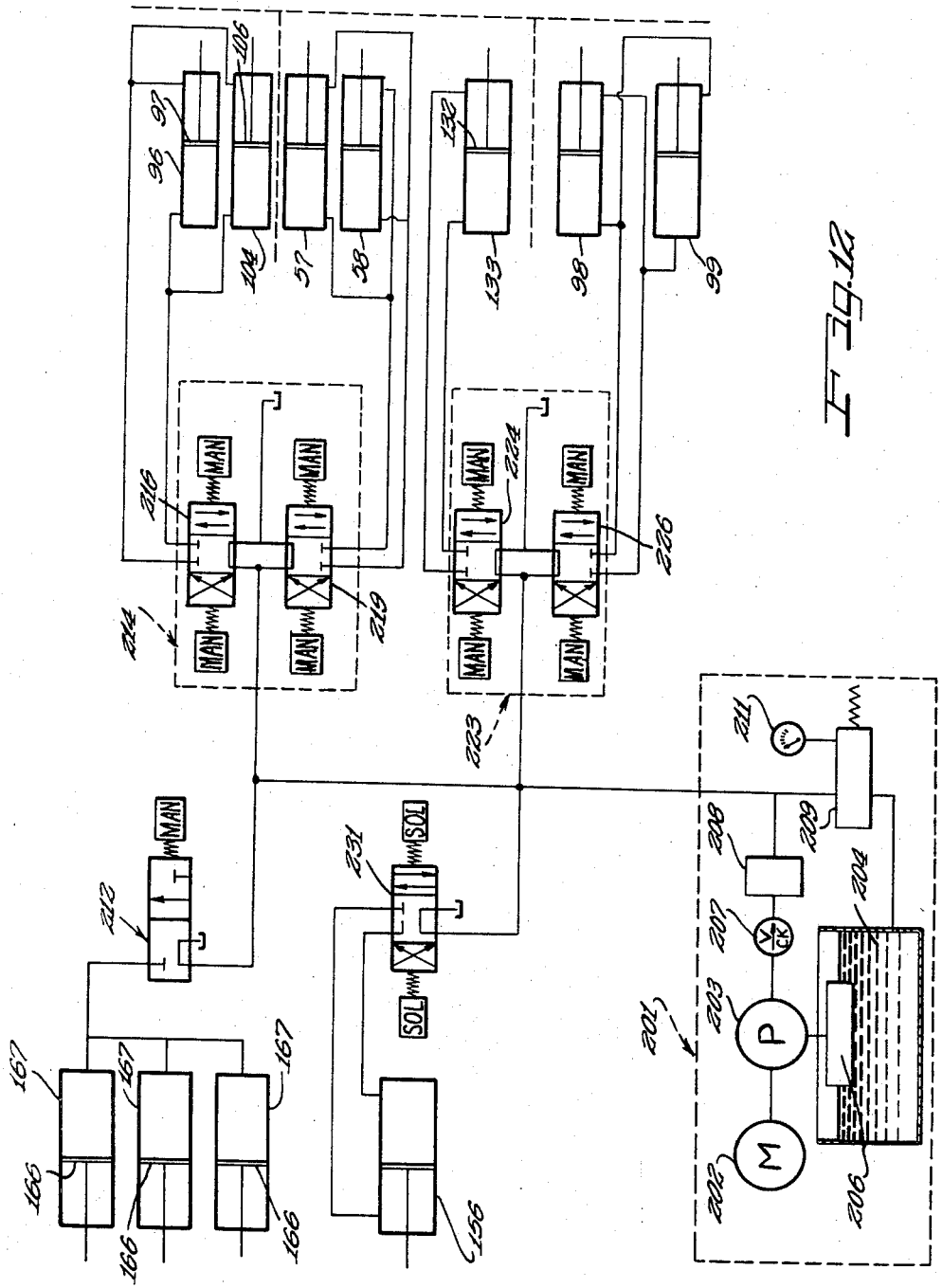

3,402,648
LEVELING MACHINE
Narciso G. Modesto, Lake Forest, Robert C. Pape, Cicero, and Wayne F. Ridenour, Chicago, Ill., assignors, by direct and mesne assignments, to General Stone and Materials Corporation, Roanoke, Va., a corporation of Virginia
Filed Sept. 15, 1966, Ser. No. 579,544
16 Claims. (Cl. 94—45)

ABSTRACT OF THE DISCLOSURE

Leveling machine for cement floors or the like adapted to be oriented to a true horizontal plane, and being provided with a scraper means which has complete mobility in that it is movable toward and away from the support frame on which it is mounted, it is angularly movable about its axis, is readily raised and lowered, and is capable of reciprocation in the transverse or horizontal position with respect to the shaft on which it is mounted.

*Summary of the invention*

The present invention is directed to a leveling machine including a support frame, leveling means on the frame for adjusting the support frame to a predetermined horizontal position, an extensible boom extending from the support frame where it is extensible and retractable with respect to the support frame, a shaft carried by the boom with its axis perpendicular thereto, a scraper means carried by the shaft, and means for angularly moving the scraper about the axis of the shaft.

The present invention deals with an improved leveling machine particularly adapted to level off cement floors or the like.

Building specifications usually require that a cement floor be level to within a specified deviation. The attainment of a smooth, flat, and level condition in a cement floor is particularly important when the floor is used as a sub-base for the laying of a terrazzo floor or the like above it. The present technique for forming a sub-base consists in first pouring the cement into forms, locating low spots which result in the initial pouring, and then covering these low spots with a dense cement having the consistency of wet sand. The final leveling procedure is done strictly by hand, and usually consists of a workman employing a relatively long piece of lumber as a troweling device over this cement covering. This procedure is very time-consuming, and requires a substantial amount of skill to produce a finished floor which comes anywhere near the required specifications.

The machine of the present invention can be made portable, and has several features which make it far more suitable for the leveling of cement floors or the like than the conventional, laborious hand operation. The machine of the present invention is adapted to be oriented to a true horizontal plane without difficulty. It is provided with a scraper means which has complete mobility in that it is movable toward and away from the support frame from which it is mounted. It is angularly movable about its axis, is readily raised and lowered, and is capable of reciprocation in the transverse or horizontal position with respect to the vertically disposed shaft on which it is mounted. All of these motions are designed to be performed by fluid pressure devices, such as hydraulic cylinders, from a remote position on the support platform. By virtue of these features, the machine can be moved into a desired location, and readily leveled to a true horizontal plane. Then, by manipulation of the hydraulic controls, the scraper blade can be positioned at a desired orientation, and at a predetermined level with respect to a datum plane. The maneuverability of the scraper blade is such that it can readily be worked into corners and the like. Furthermore, the oscillatory or reciprocating feature provides a smoothing action on the cement as the scraper blade is being drawn across the pliable cement floor.

One of the objects of the present invention is to provide an improved leveling machine which can level a freshly poured cement floor in a much shorter time than by the use of the presently existing methods.

Another object of the invention is to provide a leveling machine which is capable of leveling a floor to closer tolerances than are ordinarily possible by hand operation.

Another object of the invention is to provide a leveling machine for cement floors or the like including a scraper means which is completely maneuverable from a remote location to enable the scraper means to fit into corners and the like.

Another object of the invention is to provide a completely portable floor leveling machine including retractable wheels and adjustable leveling means for positioning the machine in a horizontal plane.

A further object of the invention is to provide a scraper means in a floor leveling machine with an oscillatory motion.

Other objects and features of the present invention will become apparent to those skilled in the art from the following description of the attached sheets of drawings in which:

FIGURE 1 is a side elevational view of a machine embodying the improvements of the present invention;

FIGURE 1A is a schematic view of the boom rotating assembly;

FIGURE 2 is an end elevational view of the machine;

FIGURE 3 is a plan view of the support frame base with the superstructure removed to illustrate the construction thereof;

FIGURE 4 is a fragmentary view partly in elevation and partly in cross-section illustrating the elevating means for the wheels;

FIGURE 5 is a cross-sectional view through the base sub-assembly;

FIGURE 6 is a view partly in cross-section and partly in elevation of the scraper blade assembly mounting;

FIGURE 7 is a fragmentary view, partly in cross-section, of the scraper blade assembly illustrating the oscillating aligning rods;

FIGURE 8 is a side elevational view of the scraper blade assembly;

FIGURE 9 is a cross-sectional view taken substantially along the line IX—IX of the boom construction illustrating the telescoping arrangement;

FIGURE 10 is a view partly in elevation and partly in cross-section of the inner boom assembly;

FIGURE 11 is a view partly in elevation and partly in cross-section of the middle boom assembly; and FIGURE 12 is a schematic diagram of a hydraulic system which may be employed with the machine of the present invention.

As shown in the drawings:

In FIGURE 1, reference numeral 20 indicates generally a floor leveling machine embodying the principles of the present invention. The basic components of the machine 20 consist of a support frame base 21, a boom assembly 22 supported in the manner of a turntable on the support base 21, and a scraper blade assembly 23 carried at the outer end of the boom assembly 22, the latter being shown in the completely retracted condition in FIGURE 1.

The base assembly 21 includes three leg assemblies 24, 26 and 27, each of which has a foot 28, 29, and 31 providing a three-point suspension for the entire machine along the surface of the floor 32. A set of three retractable wheels 33, 34 and 36 are mounted in depending relation from a support plate 37 of the base structure. As best seen in FIGURE 3, the plate 37 carries a fixed sprocket 38, the sprocket 38 being fixedly secured by means of bolts 39 to a hollow shaft 41 which is secured to the plate 37. A retaining ring 42 (FIGURE 5) is also secured to the plate 37 by means of bolts 43. A plurality of ball bearings 44 extend between the retaining ring and an inner ring 46 secured to a turntable plate 47 by means of bolts 48. A chain guard 49 is also secured to the boom assembly 20. The turntable plate 47 is, in turn, secured to the boom assembly 20, as shown in FIGURE 1. The boom assembly 20 carries a pair of opposed idler sprockets 51 and 52 in co-planar relation with the fixed sprocket 38 secured to the plate 37. A chain 53 is trained about the idler sprockets 51 and 52, and the fixed sprocket 38 as best seen in FIGURE 1A. The ends of the chain 53 are secured to piston rods 54 and 56 which are movable within hydraulic cylinders 57 and 58, respectively, the cylinders being mounted to the underside of the boom assembly 20 as shown in FIGURE 1. Consequently, when tension is applied to the chain 53 by inward movement of the piston 54, for example, the chain 53 becomes wrapped around a different segment of the periphery of the fixed sprocket 38 and consequently, the entire boom assembly 20 is rotated relative to the stationary base.

At the rearward end of the boom assembly 20 there is a platform 59 on which the operator stands while working the hydraulic controls. A plurality of valve operators 61 is provided to control the rotation of the boom assembly 20 relative to the base, to control raising and lowering of the scraper blade within the scraper assembly 23, to control extension and retraction of the telescoping sections constituting the boom assembly 20, to control raising and lowering of the wheel assemblies, and control operation of the scraper blade as will be apparent from the succeeding portions of this description.

An adjustable transit 62 is also located at the end of the boom assembly 20 for initially fixing the reference plane for the scraper assembly.

The construction of the boom assembly 20 is best seen in FIGURES 9 through 11, inclusive. The outer section of the boom assembly 20 includes two opposed channel members 64 and 66 connected by vertically extending plates 67 and 68 secured thereto. The middle boom includes a pair of opposed channel members 69 and 71 interconnected by means of vertically extending plates 72 and 73. The inner boom member includes a pair of opposed channel members 74 and 76 interconnected by means of plates 77 and 78. A pair of longitudinally extending blocks 79 and 81 are secured to the top and bottom of the middle boom assembly and a pair of rods 82 and 83 are secured to the blocks. The rods 82 and 83 are arranged to slide in adjustable bearing blocks 84 and 86, respectively, secured to the channel members 64 and 66, respectively, to provide for relative movement between the middle boom assembly and the outer housing of the boom assembly 20. Similarly, blocks 87 and 88 are secured to the top and bottom of the inner boom assembly and carry longitudinally extending rods 89 and 91 therein. The rods 89 and 91 are freely slidable within adjustable bearing blocks 92 and 93 secured to the channel members 69 and 71, respectively.

As best seen in FIGURE 10, the inner boom carries a hydraulic cylinder 96 in which a piston 97 is arranged to reciprocate by suitable introduction of a hydraulic fluid. A pair of hydraulic cylinders 98 and 99 are mounted at the forward end of the inner boom member and each has a coupling means 101 for receiving a chain which serves to rotate the scraper blade about its axis. The piston 97 is coupled by means of a coupling 102 to an end wall 103 of the middle boom.

FIGURE 11 illustrates more particularly the structure of the middle boom which includes a cylinder 104 having a piston 106 therein, the piston 106 being secured by means of coupling 107 to a block 108 extending across the boom housing near the rearward end thereof. The cylinder 104 is supported within the boom by means of a cable 109 secured to an eyebolt 111, with a turnbuckle 112 being provided to adjust tension on the cable 109.

Turning now to a consideration of the scraper blade assembly 23, with particular reference to FIGURES 1, 6 and 8, it will be seen that the scraper blade assembly includes a hollow outer casing 114 closed at one end by means of a plate 116 and at the other end by means of a plate 117. Centrally of the assembly there is a tubular shaft 118 which is capable of rotation relative to the housing 114 through the provision of spaced bearings 119 and 121 at opposite ends of the tubular shaft 118. Inside the tubular shaft 118 is a shaft 122 by means of which the scraper blade assembly generally indicated at numeral 123 is mounted. A driving connection between the tubular shaft 118 and the shaft 122 is accomplished by means of pins 124 received within a bore 126 in the shaft 122. Relative sliding movement between the two members is provided by means of a slot 127 in which the pins 124 are free to ride while still providing for a driving connection between the two shafts. The relative position of the shaft 122 within the tubular shaft 127 is determined by a ring clamp 128 having an operating handle 129, the ring clamp 128 acting as a stop which determines the elevation of the scraper blade assembly 123. The shaft 122 is provided with a coupling 131 arranged to be secured to a piston 132 mounted for movement in a cylinder 133 (FIGURE 2). The bottom of the shaft 122 is relieved as indicated in FIGURE 8 and an angle bracket 134 is secured at this location. A second angle bracket 136 is secured to the angle 134 and carries two pairs of spaced bearing members 135 and 140 as best seen in FIGURES 2 and 7. A plurality of spaced blocks 137, 138, 139 and 141 are secured in spaced relation to a plate 145 which also has secured to it the scraper blade 150. Between the blocks 137 and 138 is a pair of shafts 142 and 143, and a similar pair of shafts 144 and 146 is received between the blocks 139 and 141. As best seen in FIGURE 7, shaft 142 is received within the blocks 137 and 138 by providing a series of roll pins 153 and 154 on the shaft 142. Similar roll pins, of course, are provided for the other shafts.

The hydraulic cylinder 156 has a piston 157 reciprocable therein, the piston 157 carrying a clevis 158 which is coupled to a bracket 159 secured to the scraper blade 150. Thus, movement of the piston 157 causes the entire scraper blade assembly including the shaft 142, 143, 144 and 146, together with the blocks 137, 138, 139 and 141 to reciprocate relative to the main shaft 122 within the pair of bearings 135 and 140. This oscillatory motion of the scraper blade 150 is beneficial in providing a smoothing action to the pliable cement as the scraper blade is pulled across the floor.

Returning to FIGURE 6, it will be seen that the outer tubular shaft 118 is provided with a sprocket 161 about which a chain 162 is trained, the ends of the chain being connected to the fittings 101 at the ends of the cylinders 98 and 99 of the inner boom section shown in FIGURE 10. Movement of the chain 162 by actuation of the pistons in the cylinders thereby causes the entire scraper bar assembly to rotate about the axis of the shaft 122, thereby permitting the scraper blade 150 to be maneuvered into corners and the like.

Next, there will be described the leveling devices and the wheel structures which are best shown in FIGURES 3 to 5, inclusive. Taking the wheel assembly 33 as typical, it will be seen that assembly includes a wheel 164 mounted on a caster 165. The wheel structure has a shank 166 which extends into a cylinder 167. The shank 166 has a slot 169 formed therein, and a pin 170 extends through the cylinder 167 and through this slot. The top of the cylinder is closed by means of a plug 171. Fluid under pressure is introduced into the cylinder chamber by means of a fluid pressure line 172. Thus, with the introduction of fluid under pressure into the cylinder chamber, the wheels are lowered to a position where they rest on the floor 32, raising the entire machine off the support leg assemblies 24, 26 and 27 which normally support the machine, permitting it to be moved to a different location.

One of the leg assemblies such as the leg assembly 24 is kept fixed during leveling of the base, while the other leg assemblies 26 and 27 can be made outwardly adjustable by employing a structure of the type shown in FIGURE 5. This structure includes a housing 176 closed at one end by means of a retainer 177, the latter being secured to the housing 176 by means of bolts 178. The bolts extend into the head end portion 179 of a threaded stud 180. Located within the housing thus provided is the threaded shank portion 181 of the foot 29. Nuts 182 and 183 position the foot 29 a predetermined distance from the bottom of the housing 176.

The stud 180 is received in threaded engagement with an adjusting nut 184 having a square upper end 186 to which a wrench can be applied. The adjusting nut 184 is rotatable within a flanged housing 187 which is secured to the base plate 37. A set screw 188 has a reduced diameter end portion which extends into a slot 189 between the housing 176 and the housing 187. Thus, when the adjusting nut 186 is turned in a clockwise direction, it causes the stud 180 to ride up higher into the adjusting nut, with rotation of the outer housing being prevented by the engagement of the set screw 188 within the slot 189.

It should also be mentioned that in addition to the main adjusting devices, the base can be provided with auxiliary retractable legs 191 and 192 to stabilize the support of the machine once a level condition has been achieved.

Turning now to the hydraulic system shown in FIGURE 12, there is provided a power unit 201 which includes an electric motor 202 driving a pump 203. A reservoir 204 supplies hydraulic fluid through a strainer 206 into the inlet of the pump 203. The pump discharges through a check valve 207 into a filter 208 and then into the various branch hydraulic systems. A relief valve 209 is provided in the power unit, and a pressure gauge 211 is also included.

The three piston and cylinder assemblies for raising and lowering the wheels have each been identified at reference numerals 166 and 167, respectively. These piston and cylinder assemblies are simultaneously actuated from a manual valve 212.

A toggle valve assembly generally indicated at numeral 214 controls the actuation of the telescoping booms, and the turntable which rotates the boom assembly relative to the base. The valve for controlling operation of the cylinders 96 and 104 which control telescoping movement of the boom is identified at reference numeral 216. A valve 219 controls operation of the turntable cylinders 57 and 58. A second toggle valve assembly 223 has a pair of valve members 224 and 226. These valves control the blade lifter cylinder 133, and the cylinders 98 and 99 which provide for rotating the scraper blade.

A solenoid valve 231 controls the introduction of hydraulic fluid into the cylinder 156 which controls oscillation of the scraper blade 150.

The operation of the machine will now be described.

The operator rolls the machine into position and then retracts the wheels 33, 34 and 36. Next, the machine is positioned in a true horizontal plane by adjusting the adjustable leg assemblies 26 and 27 with the aid of a spirit level or the like. Then, the operator raises or lowers the transit 62 until it is aligned with a mark on a wall of the building which is being used to define the datum plane. Then, the position of the transit 62 is held fixed, and the shaft 122 is raised or lowered until a previously inscribed mark on the shaft or the like is aligned with the horizontal crosshair of the transit. The handle 129 is then turned to a clamping position so that the ring clamp 128 holds the scraper blade 150 at the proper elevation from the floor. Then, by the use of the hydraulic control system, the inner boom and the middle boom are extended from the outer housing of the boom assembly 20, thereby bringing the scraper blade 150 into the desired working area. The angular position of the scraper blade 150 is then adjusted through the operation of the hydraulic cylinders 98 and 99 to a desired angle. Then, operation of the control circuits for the telescoping boom assemblies permits the scraper blade 150 to move the excess material toward any desired location. At the same time, the blade 150 can be oscillated by actuation of the hydraulic cylinder 156. In operation, the boom assembly is rotatable through an arc of about 270° with respect to the base, and the scraper blade 150 is rotatable through an arc of 180° with respect to the boom assembly. Thus, the scraper blade is maneuverable over a very large area for every fixed position of the machine.

If the operator should encounter a large surplus of concrete in any given area, he can manipulate the controls to operate the blade lifting cylinder 133 and cut down the excess in increments. The positioning of the ring clamp 128 always permits the scraper blade 150 to be returned to its initial predetermined position.

From the foregoing, it will be understood that the machine of the present invention provides a completely flexible floor leveling assembly which eliminates many of the deficiencies heretofore encountered with the hand leveling methods heretofore used.

It should be evident that various modifications can be made to the described embodiments without departing from the scope of the present invention.

We claim as our invention:

1. A leveling machine for cement floors and the like comprising a support frame, leveling means on said frame for supporting said support frame in a predetermined plane, a boom extending from said support frame and being extensible laterally outwardly from said frame, a shaft carried by said boom, said shaft having its axis perpendicular to the axis of said boom, a scraper means carried by said shaft, and means for angularly moving said scraper about the axis of said shaft.

2. The leveling machine of claim 1 which said frame includes vertically positionable wheels for moving said frame along the surface of the floor.

3. The leveling machine of claim 1 in which said boom is composed of telescoping sections.

4. The leveling machine of claim 1 which includes means for raising and lowering said scraper with respect to said support frame.

5. The leveling machine of claim 1 which includes means for reciprocating said scraper laterally with respect to said shaft.

6. The leveling machine of claim 1 which includes means for raising and lowering said scraper means with respect to said boom.

7. The leveling machine of claim 2 which includes means for locking the vertical position of said leveling means with said wheels in an elevated position off said floor.

8. A leveling machine for cement floors or the like comprising a portable support frame, a boom carried by said support frame, said boom being composed of telescoping sections, means in each of said sections operated by fluid pressure for moving that section relative to the others, a shaft supported at the outward end of said boom, a scraper bar secured to said shaft for leveling the floor to a true horizontal plane, means for moving said scraper bar about the axis of said shaft, and means for raising and lowering said scraper bar relative to said boom.

9. The leveling machine of claim 8 which also includes means for reciprocating said scraper means horizontally relative to said shaft.

10. The leveling machine of claim 8 which includes adjustable support means for positioning said support frame on a floor in a true horizontal plane.

11. The leveling machine of claim 10 which includes retractable wheels positionable to engage said floor and permitting movement of the machine along the floor.

12. In a leveling machine for cement floors or the like, a base, a support frame mounted for angular movement about said base, an extensible boom extending horizontally from said support frame, means for extending and retracting said boom relative to said support frame, a vertical shaft carried by said support frame, and an angularly movable horizontally disposed scraper blade secured to said shaft.

13. The machine of claim 12 which includes means for raising and lowering said scraper blade jointly with said shaft.

14. The machine of claim 12 which also includes means for raising and lowering said boom relative to said support frame.

15. The machine of claim 12 which also includes means for horizontally reciprocating said scraper blade relative to said shaft.

16. The machine of claim 12 in which extensible boom consists of telescoping sections.

References Cited

UNITED STATES PATENTS

| | | | |
|---|---|---|---|
| 842,770 | 1/1907 | Connelly | 94—45 |
| 1,021,557 | 3/1912 | Runner | 94—45 |
| 1,082,959 | 12/1913 | Knight | 94—39 X |
| 1,565,657 | 12/1925 | Lichtenberg | 94—46 |
| 1,717,734 | 6/1929 | Robb | 94—46 |
| 2,435,052 | 1/1948 | Parrett | 94—45 X |
| 2,746,366 | 5/1956 | Reed | 94—45 |

NILE C. BYERS, JR., *Primary Examiner.*